United States Patent [19]
Hsueh

[11] Patent Number: 5,588,698
[45] Date of Patent: Dec. 31, 1996

[54] RECLINABLE MOTORCYCLE BACKREST WITH SADDLE CUSHION COVER HAVING SUN RAY BLOCKING FUNCTION

[76] Inventor: Tien-Chu Hsueh, 467, Yuan-Shan Rd., Chung-Ho City, Taiwan

[21] Appl. No.: 247,900

[22] Filed: May 23, 1994

[51] Int. Cl.⁶ .................................................. A47C 7/62
[52] U.S. Cl. .................. 297/184.11; 297/219.11; 297/378.12; 297/188.04; 280/288.4
[58] Field of Search ................... 297/230.1, 219.1, 297/219.11, 184.1, 184.11, 354.1, 353, 378.1, 378.12, 378.14, 188.04, 188.01; 280/290, 288.4

[56] References Cited

U.S. PATENT DOCUMENTS

| | | | |
|---|---|---|---|
| 3,537,746 | 11/1970 | Peters | 297/184.11 X |
| 4,458,738 | 7/1984 | Wilson | 297/184.11 X |
| 4,790,592 | 12/1988 | Busso et al. | 297/184.11 |
| 4,953,911 | 9/1990 | Hanagan | 297/378.14 X |
| 5,080,431 | 1/1992 | Frazier | 297/184.11 |

FOREIGN PATENT DOCUMENTS 208274  4/1940  Switzerland .

*Primary Examiner*—Milton Nelson, Jr.
*Attorney, Agent, or Firm*—Michael D. Bednarek; Kilpatrick & Cody

[57] ABSTRACT

A reclinable motorcycle backrest having a sun-shielding saddle cover mounted on a motorcycle cargo rack, includes a support bracket, a backrest assembly, and a pivotal rod tying the other two pieces together. Stored in the backrest assembly is a roll of sun-proof shielding cloth functioning as a motorcycle saddle cover sheet which is extractable from a retraction compartment by cranking a crank bar alongside the assembly. The backrest may be erected in an up-right position when used in carrying passengers or may be reclined forward with its cover sheet extended out to cover the saddle so that the saddle stays cool even when in strong sun.

5 Claims, 3 Drawing Sheets

RECLINABLE MOTORCYCLE BACKREST WITH SADDLE CUSHION COVER HAVING SUN RAY BLOCKING FUNCTION

BACKGROUND

The present invention relates generally to a reclinable motorcycle backrest, and more particularly to a reclinable motorcycle backrest with a saddle cover having a sun blocking function.

In general, a motorcycle saddle, when exposed to sunshine for a period of time, becomes very hot and uncomfortable for riders to sit on. The riders have to cover the saddle with something or move the motorcycle to a shaded area for some period of time in order to keep it cool. For the foregoing reasons, there is a need to provide a sun-proof material to prevent saddles from being overheated.

Moreover, the motorcycle backrest of the prior art is normally fixed in position, and thus it can not provide a covering function by reclining it forward.

SUMMARY OF THE INVENTION

In view of shortcomings as described above, it is therefore an object of this invention to provide a new reclinable motorcycle backrest with a sun-proof saddle cover which extends from the slot on the back of the backrest. This invention includes:

a support bracket having a set of receptacles each with an arresting recess mounted on the motorcycle cargo rack;

a backrest assembly including: a main body having a soft pad on one side and a retraction compartment on the other side, jointed pivotally at bottom ends with the support bracket; a scroll having one flat end protruding out of the main body; a roll of sun-shielding cloth having one end fixed onto the scroll; a back-cover board having a slot for covering the roll of sun-shielding cloth stored in the retraction compartment wherein the sun-shielding cloth is pulled out through the slot; a crank bar having a cranking hole, composed of a long hole and a round hole, at one end; and a fixing pivotal rod having two latching ears used to latch on the arresting recess to stop the backrest assembly from reclining down.

The sun-shielding cloth is wrapped around the scroll to form a sheath to hold the scroll and is secured by a slotted steel tubular clip.

Further, at the end of the crank bar, is a slidable roll-pin with a ball shaped knob at one end and a grooved neck at the other end which is inserted in a first opening on the side-wall of the backrest assembly to prevent the crank bar from rocking.

There is a second opening which is perpendicular to the first opening, working with a ball headed pin pressed against the grooved neck of the roll-pin and a second compression spring to stop the roll-pin from sliding out of the first opening.

The roll-pin has a first compression spring which is butted between the crank bar and the ball shaped knob so as to spring out the roll-pin of the second opening.

The cross section of the fixing pivotal rod is square, and the latching ears have square holes to let the fixing pivotal rod slide through.

BRIEF DESCRIPTION OF THE DRAWINGS

The present invention can be more fully understood by reference to the following detailed description and accompanying drawings, which form the integral part of this application, and wherein.

DESCRIPTION OF THE PREFERRED EMBODIMENT

Figure 1:
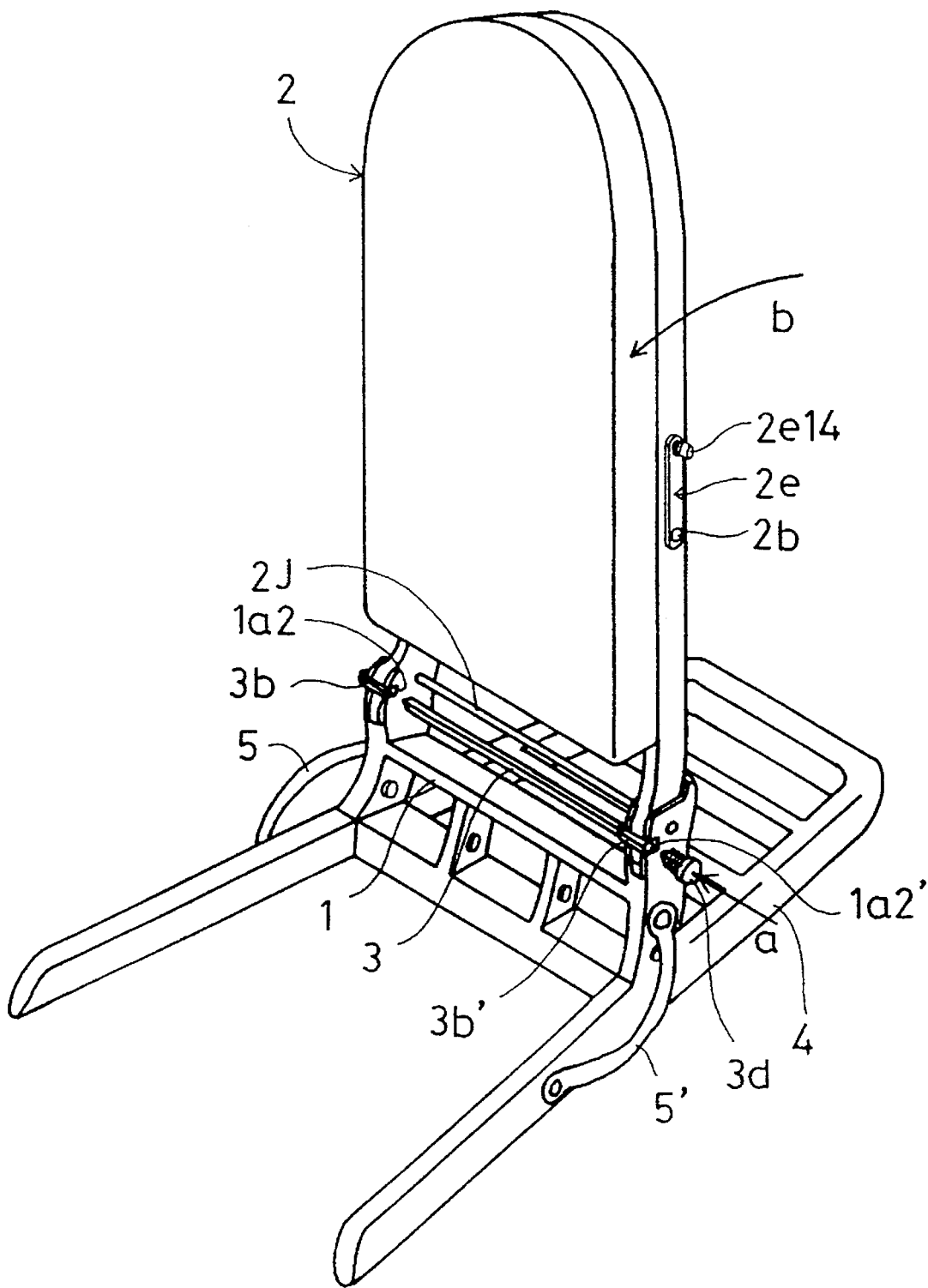
FIG. 1 is a diagram of the structural assembly of the reclinable motorcycle backrest according to the present invention.

Referring to FIG. 1, the reclinable backrest with a sun-proof saddle cover in this invention includes a support bracket 1, and a backrest assembly 2 jointed pivotally at bottom ends with the support bracket 1 by a long rod 2J. Both the backrest assembly 2 and the support bracket 1 have arresting recesses 1a2, 1a2' on each side so that they can hold two latching ears 3b, 3b' fixed on two ends of the slidable fixing pivotal rod 3 which runs through the square rod-holes 1a5-1a5' and 2a5-2a5' on the support bracket 1 and the backrest assembly 2 respectively. When the reclinable backrest assembly is erected in an up-right position, the slidable fixing pivotal rod 3 is pushed to a position so that the latching ears 3b,3b' can rest on the arresting recess 1a2, 1a2' so as to stop the reclinable backrest assembly from reclining down.

Figure 2:
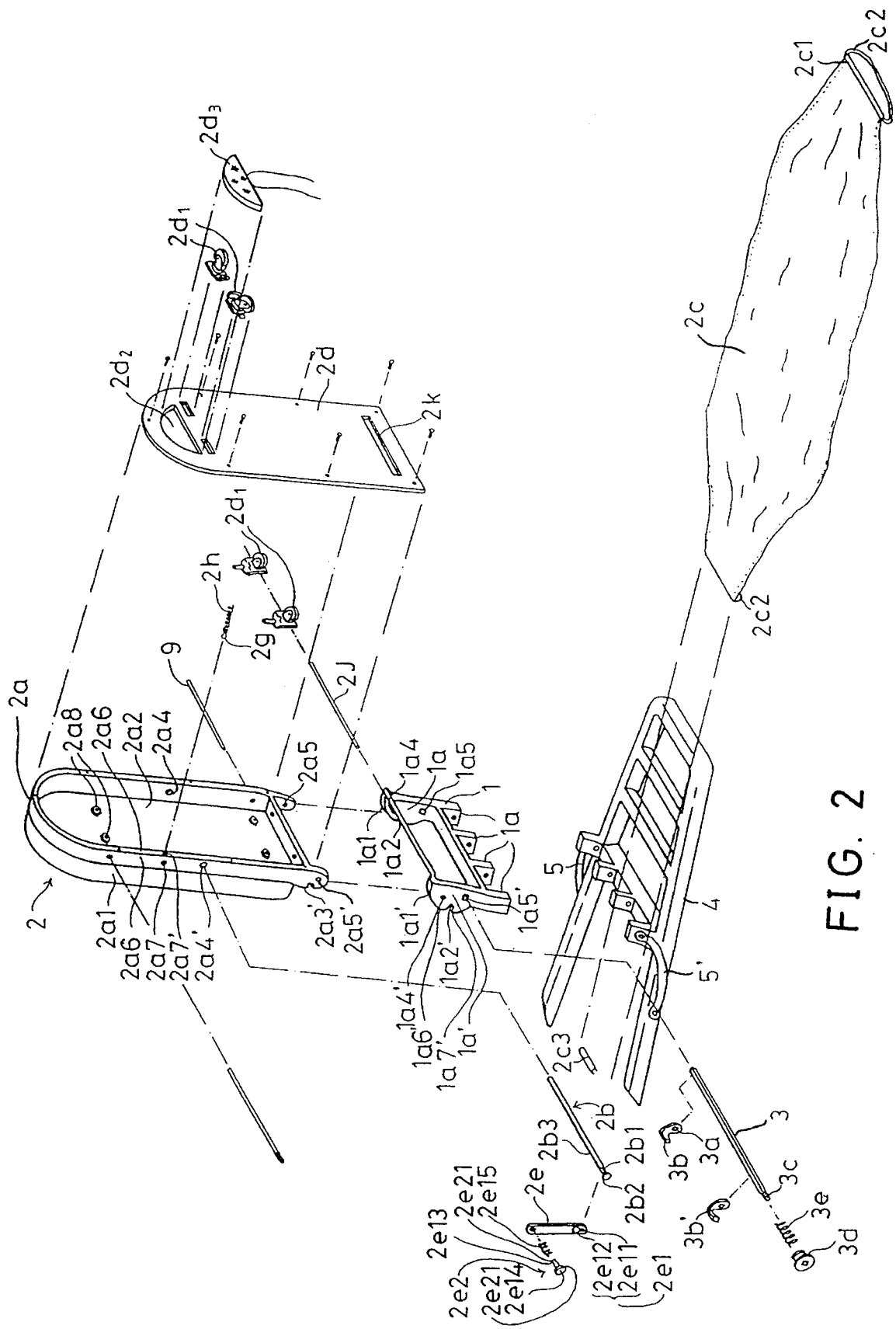
FIG. 2 is an exploded view of the structural assembly of the reclinable motorcycle backrest according to the present invention.

The following is the detailed description of the components and their relationship in the assembly structure of this invention:

Referring to FIG. 2, the support bracket 1 has four groove butts 1a with holes fitted onto the motorcycle cargo rack 4. On two sides of the upper part of the support bracket 1 are a set of receptacles 1a8 and 1a8' having grooves 1a1, 1a1'; arresting recesses 1a2, 1a2' form cut-outs on the side-walls of the receptacle. The arresting recesses 1a2, 1a2' are formed by a first protuberance 1a6' and a second protuberance (not shown), and a first flat end 1a7' and a second flat end (not shown). Below these elements are rod-holes 1a5, 1a5'.

The backrest assembly 2 includes a main body 2a, a scroll 2b, a roll of sun-shielding saddle cover sheet 2c, a back-cover board 2d having a slot 2k, a cut out portion $2d_2$, a cover portion $2d_3$; and a crank bar 2e. The main body 2a looks like a solid U-shaped board with a wall 2a6 around its rim. A soft pad 2a1 is bolted to the base plate of the main body 2a with two bolts 2a8. The U-shaped wall and the base plate form a retraction compartment 2a2 wherein the roll of sun-shielding saddle cover sheet is stored. There are two bumps at the lower ends of the main body 2a. However, only one bump is shown and indicated by reference character 2a3'. On the left side of the wall 2a6 are the rod holes 2a5 and a pit 2a4. On the right side of the wall 2a6 are another rod hole 2a5' and the other pit 2a4', and a first opening 2a7 which is met by a second opening 2a7' drilled from the top of the wall and is therefore perpendicular to the first opening 2a7. The scroll 2b is a round rod having one end ground to form a neck 2b1 and a head 2b2, and a roll-pin eye 2b3 for a wire or roll-pin to be inserted through. One end of the roll of sun-shielding cover sheet 2c may be sewn to form a scroll-sheating portion 2c4 for holstering the scroll 2b, while another end may be sewn to holster a steel tube 2c1. A rubber string going through the tube 2c1 to form a sling handle 2c2. The crank bar 2e has an insertion hole 2e1 consisting of a long hole 2e11 and a round hole 2e12, wherein the width of long hole 2e11 matches the diameter of the neck of the scroll 2b1 and the diameter of the round hole 2e12 matches the diameter of the scroll 2b. On the other end of the crank bar 2e is a roll-pin 2e2 which has a protrusive cap 2e21 and a neck 2e13 at one end, and a ball-shaped knob 2e14 on the other end. Besides, there is a spring coil 2e15 freely stretched in between the crank bar 2e and the balled-shaped knob 2e14.

Also shown in FIG. 2 are rollers $2d_1$ and supports 5,5'. The slidable fixing pivotal rod 3 is basically a square shaft with one end through a square hole 3a on the latching ear 3b, and the other end going through the other latching ear 3b'. At the tip of one end of the rod 3, there are threads 3c and spring coil 3e for fastening the screw cap 3d.

The following is the assembling procedure:

First, run scroll 2b through the round hole 2e12 of the crank bar 2e and the scroll-sheathing portion 2c4 of the saddle cover sheet 2c. Next, insert a wire or roll-pin through the roll-pin eye 2b3 on the scroll 2b so as to fix the scroll 2b onto the main body 2a in a pivotal manner. In the meantime, attach the saddle cover sheet 2c and the crank bar 2e to the main body 2a. Then clamp the scroll-sheathing portion 2c4 of the saddle cover sheet 2c and the sheathed scroll 2b with a slotted steel tubular clip 2c3 to ensure the saddle cover sheet 2c com roll with the scroll 2b when cranking motion starts, otherwise the scroll 2b may not be able to grip the saddle cover sheet and will just keep spinning within the scroll sheathing portion 2c4. Through the long hole 2e11 matched with the head 2b2 of the scroll 2b, the crank bar 2e can roll up the saddle cover sheet 2c around the axis of the scroll 2b.

To form a retraction compartment, first insert a ball-headed pin 2g, along with a compression spring 2h around its shaft, into the second opening 2a7' on the wall top of the main body 2a; then screw the back-cover board 2d onto the main body 2a. The handle tube 2c1 should be extended out through the slot 2k on the back-cover board 2d. Finally run the long rod 2J through the first rod hole 1a4 of the support bracket 1 and the rod-holes 2a5, 2a5' of the backrest assembly 2 so as to pivotally fix the backrest assembly 2 to the support bracket 1. Run the slidable fixing pivotal rod 3 with a third compression spring 3e capped with a screw head 3d, through the first square rod-hole 1a5', the right latching ear 3b', the left latching ear 3b, and the left square rod-hole 1a5; and thus the assembling procedure is completed.

In addition, two handgrip straps are installed onto the sides of the cargo rack 4 and the support bracket 1 by screw bolts. There also is a guiding rod 9 running through the retraction compartment to ease the roll-out motion.

Next, the operational instruction is, as follows:

Referring to FIG. 1, the backrest assembly is shown in an up-right position where the roll-pin 2e2 of the crank bar 2e is inserted in the first opening 2a7.

Figure 3:
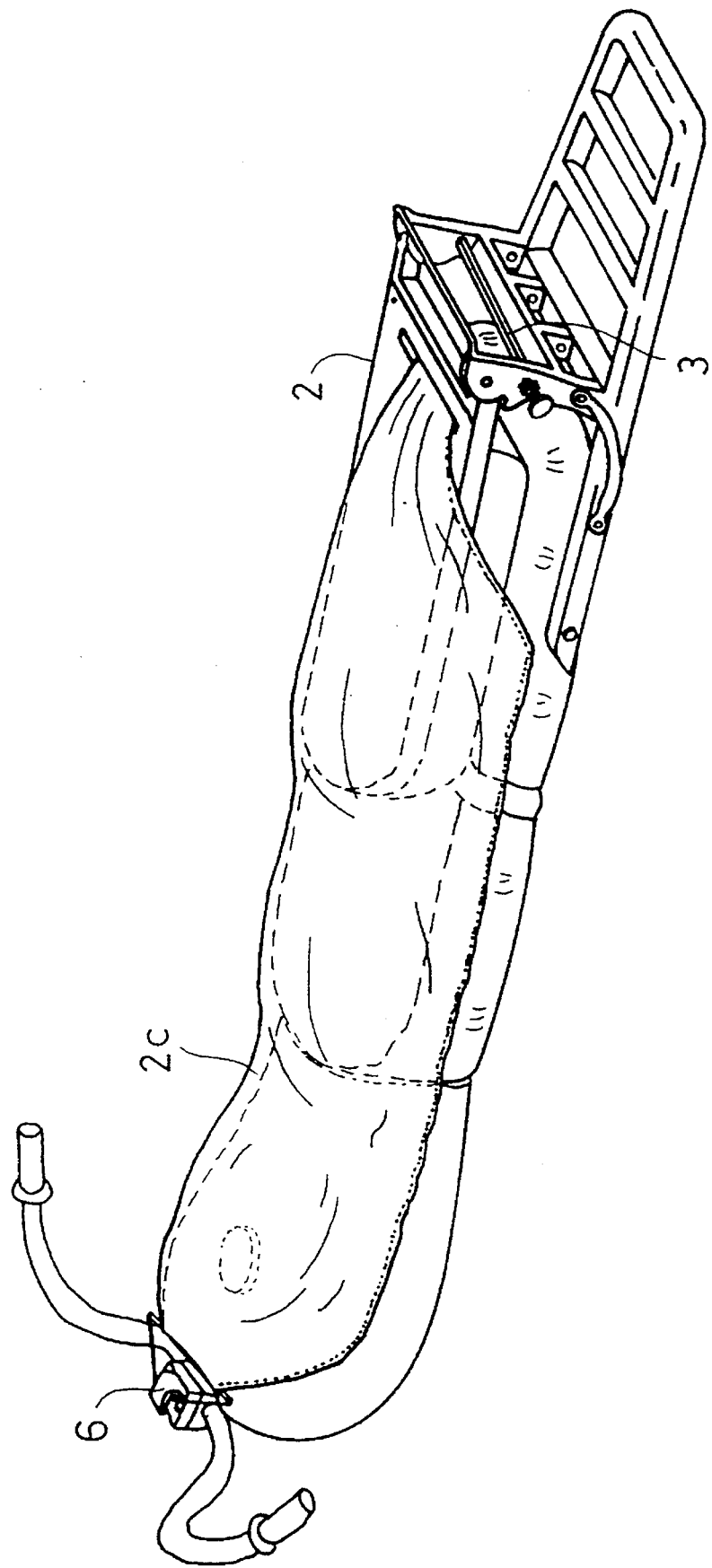
FIG. 3 shows a reclined backrest assembly with a fully stretched saddle cover according to the present invention.

To cover the saddle, first depress the screw cap 3d and push the slidable fixing pivotal rod 3 inwards (as pointed by the arrow a) to a position that the latching ears 3b, 3b' slide out of the arresting recess 1a2 and 1a2'; meanwhile, the backrest assembly 2 may recline downwards or towards the front of motorcycle( as pointed by the arrow b); then, pull the sling handle 2c2 hanging outside of the back-cover board 2d until the cover sheet 2c is spread out enough to reach the hook 6 on the handset of the motorcycle (as shown in FIG. 3.)

When it is no longer needed, first pull out the roll-pin 2e2 from the first opening 2a7, and then adjust the long hole 2e11 of the crank bar 2e until it aligns with the neck 2b1 of scroll 2b; and then snap it on. In the meantime, crank the crank bar 2e to roll up the saddle cover sheet 2c until it is fully retracted into the backrest assembly 2. After retracting the cover sheet 2c, move the round hole 2e12 of the crank bar 2e to align with the circular part of scroll 2b; then push the roll-pin 2e2 into the first opening 2a7. Concurrently, the ball headed pin 2g of the second opening 2a7', driven by the compressed spring 2h, is butting against the neck 2e13 of the roll-pin 2e2 to prevent the roll-pin 2e2 from springing out of the first opening 2a7 under the exertion of spring 2e15.

To resume the up-right position, all that is needed is to pull up the backrest assembly 2 until the latching ears 3b, 3b' click into the arresting recess 1a2, 1a2' respectively; this stops the backrest assembly 2 from reclining down.

The invention has been described above in terms of some important, preferred embodiments; however, this invention is not limited to the disclosed embodiments. On the contrary, for a person skilled in the art, it is intended to cover various modifications and similar arrangements included within the spirit and scope of the appended claims, the scope of which should be accorded the broadest possible interpretation so as to encompass all such modifications and similar structures and processes.

What is claimed is:

1. A reclinable motorcycle backrest having a sun-shielding saddle cover and being mounted on a motorcycle cargo rack, comprising:

a support bracket mounted on the motorcycle cargo rack having a set of receptacles, each of said receptacles being provided with one of a corresponding set of arresting recesses; and a backrest assembly including: a main body having a soft pad on one side and a retraction compartment on another side, said main body being jointed pivotally at bottom ends with said support bracket; a scroll having one flat end protruding out of said main body; a roll of sun-shielding cloth having one end fixed onto said scroll; a back-cover board having a slot for covering said roll of sun-shielding cloth stored in said retraction compartment wherein said sun-shielding cloth is pulled out through said slot; a crank bar having a cranking hole composed of a long hole and a round hole formed at one end; and a pivotal rod having two latching ears at each end, each of said latching ears latching onto one of said set of arresting recesses, thereby stopping said backrest assembly from reclining down.

2. The reclinable motorcycle backrest having a sun-shielding saddle cover as claimed in claim 1, wherein said sun-shielding cloth is securely clipped on said scroll by a slotted tubular clip.

3. A reclinable motorcycle backrest having a sun-shielding saddle cover as claimed in claim 1, wherein the cross section of said pivotal rod is square, and said support bracket and said backrest assembly have square holes to let said pivotal rod slide through.

4. A reclinable motorcycle backrest having a sun-shielding saddle cover as claimed in claim 1, wherein the end of said crank bar has a slidable roll-pin with a ball shaped knob at one end and a grooved neck at the other end which is inserted in a first opening on a side wall of said backrest assembly to prevent said crank bar from rocking.

5. A reclinable motorcycle backrest having a sun-shielding saddle cover as claimed in claim 4, wherein said backrest assembly has a second opening which is perpendicular to said first opening, a ball headed pin pressed against said grooved neck of said roll-pin and a compression spring to stop said roll-pin from sliding out of said first opening.

* * * * *